United States Patent [19]

Campbell et al.

[11] Patent Number: 6,061,888

[45] Date of Patent: May 16, 2000

[54] SEVERING AND INSERTION DEVICE FOR INSERTING SPACERS

[76] Inventors: Printess Campbell, 696 Fisher Ford Rd., Lancaster, Ky. 40444; J. Richard Clay, 412 N. Maple Ave., Danville, Ky. 40422

[21] Appl. No.: 09/153,509

[22] Filed: Sep. 15, 1998

[51] Int. Cl.[7] .................................................. B23P 17/00
[52] U.S. Cl. ............................. 29/417; 29/811.2; 227/15
[58] Field of Search .................................. 29/809, 811.2, 29/417, 252; 227/15, 17, 18, 138

[56] References Cited

U.S. PATENT DOCUMENTS

| | | |
|---|---|---|
| 2,385,521 | 9/1945 | Mead . |
| 3,596,821 | 8/1971 | Rogers ..................... 227/138 |
| 3,848,322 | 11/1974 | Kuehn et al. . |
| 4,040,164 | 8/1977 | Briles . |
| 4,899,438 | 2/1990 | Muller et al. . |
| 5,317,853 | 6/1994 | Lopes . |
| 5,605,270 | 2/1997 | Dunn ........................ 227/140 |
| 5,666,708 | 9/1997 | Vianello ................... 29/33 K |
| 5,732,870 | 3/1998 | Moorman et al. ........ 227/130 |
| 5,738,265 | 4/1998 | Hirai et al. ................ 227/18 |
| 5,813,114 | 9/1998 | Blacket et al. . |

FOREIGN PATENT DOCUMENTS 1955647  2/1967  Germany .

OTHER PUBLICATIONS

U.S. Co–pending application No. 08/934,466, filed Sep. 17, 1997.

Primary Examiner—David P. Bryant
Assistant Examiner—Jermie E. Cozart
Attorney, Agent, or Firm—Kenneth F. Pearce

[57] ABSTRACT

A device and automated method for inserting spacers into grooves of frames. The device and method are particularly useful in the woodworking industry. Resilient substances are severed into sections to form the spacers which are thereafter pneumatically inserted into the groove. The apparatus can be provided with a positioner for advancing the resilient substance. A timer may also be utilized to calibrate actuation of the device.

20 Claims, 2 Drawing Sheets

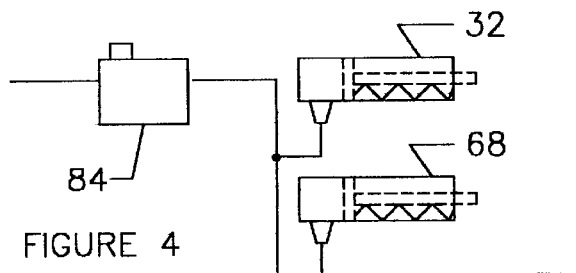
FIGURE 4
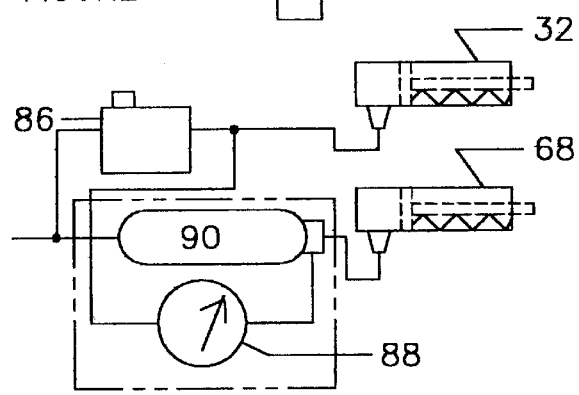
FIGURE 5
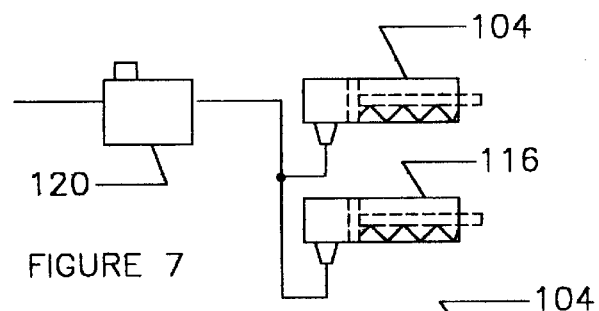
FIGURE 7
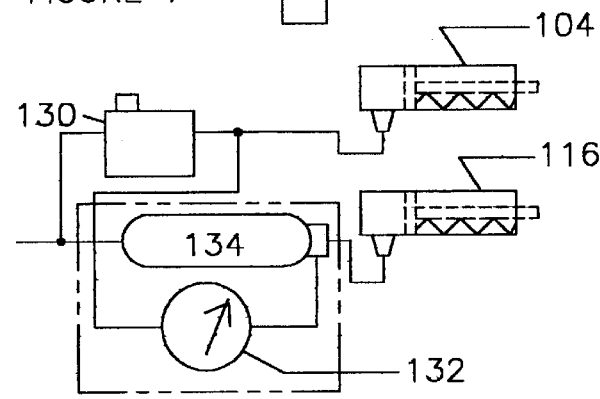
FIGURE 8
STEP 1
NON-MANUALLY SEVERING A SECTION OF RESILIENT SUBSTANCE, AND PNEUMATICALLY INSERTING THE SECTION INTO THE GROOVE.
STEP 2
PNEUMATICALLY POSITIONING THE RESILIENT SUBSTANCE, BEFORE SEVERING A SECTION THEREFROM.
FIGURE 9

SEVERING AND INSERTION DEVICE FOR INSERTING SPACERS

BACKGROUND OF THE INVENTION

1. Field of the Invention

The present invention is directed toward a device and automated method for inserting spacers into the groove of a frame. In the art, the unpredictably asymmetrical expansion and contraction of wood requires the use of spacers so frames and the like are kept in proper alignment. Prior to the present invention, it is believed it was very common to insert spacers into grooves by hand. Moreover, it is Applicant's understanding that prior to the present invention, rubber balls and rubber blocks having squared corners rather than sections of resilient substances were the standard spacers for the industry. Although the present invention is particularly useful in woodworking arts, one or more embodiments of the device and method can easily be adapted to sever a resilient substance and to thereafter insert the resultant spacer into any groove of any type of material. Within the scope of the present unity of invention, mechanical, pneumatic or various combined embodiments thereof and the methods therefor can be utilized to insert spacers into grooves.

2. Description of the Previous Art a) Application Ser. No. 08/934,466, entitled—Insertion Device—Filed Sep. 19, 1997 and assigned to Saturn Tool Company, LLC. This commonly owned co-pending Application discloses a devices and methods for inserting pliable spheroids into grooves.

b) U.S. Pat. No. 2,385,521-Mead discloses a machine having a magazine loaded with workpieces. Preferably, the workpieces are shaped as discs. The Mead apparatus first feeds and then holds a disc for a drill press to bore a hole through the workpiece. After the boring is completed, the device advances the finished disc while feeding another unfinished workpiece into the holding position.

c) U.S. Pat. No. 5,317,853-Lopes requires a plurality of spheres of limitedly compressible resilient material to be disposed in the grooves of the vertical stiles and horizontal rails forming the frame of the door. Mortise and tenon joints urge the central panel toward the spheres contained in the grooves of the stiles and rails. For its utility, Lopes mandates a completed cabinet door having a plurality of spheres in its frame. Interestingly, U.S. Pat. No. 5,317,853 is completely silent regarding how the plurality of spheres is placed in the cabinet door frame.

SUMMARY OF THE INVENTION

The present unity of invention includes devices and automated methods for inserting spacers into grooves. It is believed that prior to the present invention, rubber balls and rubber blocks were the standard spacers in the industry. The current invention meets the long felt but previously unfilled capacity for first generating and thereafter inserting spacers composed of sections of resilient substances into the grooves.

An object of the present invention is to provide a device for inserting a spacer into a groove.

Another object of the present invention is to provide a device capable of rapidly inserting spacers into grooves.

Yet another object of the present invention is to provide an automated method for inserting spacers into grooves.

Still another object of the present invention is to provide an automated method for rapidly inserting spacers into grooves.

Yet another object of the present invention is to provide a device particularly useful in the woodworking industry.

It is another object of the present invention to provide a handheld device for inserting spacers.

It is yet another object of the present invention to provide a tabletop device for inserting spacers.

Yet still another object of the present invention is to provide a device and method for inserting arced sections of resilient substances into grooves.

It is still another object of the present invention to provide a pneumatically assisted device for inserting spacers.

It is yet another object of the present invention to provide a device for inserting a section of resilient substance into a groove.

It is still another object of the present invention to provide a device for pneumatically positioning the resilient substance.

It is another object of the present invention to provide a device for pneumatically severing a section away from the resilient substance.

It is still another object of the present invention to provide a device utilizing a resilient filament as the workpiece.

It is yet another object of the present invention to provide a device utilizing a sheet of resilient substance as the workpiece.

As used herein, "spacer" shall mean any tangible object which is inserted into a groove. One or more spacers can be inserted into any groove.

A first embodiment of the present invention can be described as a pneumatic device for inserting the spacer into a groove of a frame, comprising: a driver for severing a section away from a resilient substance, thereafter forcing the section through a channel into the groove, and a source of pneumatic energy. Another embodiment of the present invention can be described as a pneumatic device for inserting the spacer into a groove of a frame, comprising: a cutter for severing a section away from a resilient substance, a hammer for forcing the section through a channel into the groove, and a source of pneumatic energy. Another embodiment in accord with the solidarity of the present invention includes the method comprising the steps of: non-manually severing a section away from a resilient substance, and pneumatically inserting the section into the groove.

It is the novel and unique interaction of these simple elements and steps which creates embodiments within the ambit of the present unity of invention. Pursuant to Title 35 of the United States Code, descriptions of preferred embodiments follow. However, it is to be understood that the best mode descriptions do not limit the scope of the present invention. The breadth of the present invention is identified in the claims appended hereto.

BRIEF DESCRIPTION OF THE DRAWINGS

FIG. 4 is a schematic representation of a type of pneumatic circuit for one embodiment of the present invention.

FIG. 5 is a diagrammatic representation of another type of pneumatic circuit for an embodiment of the present invention.

FIG. 7 is a schematic representation of a type of pneumatic circuit for one embodiment of the present invention.

FIG. 8 is a diagrammatic representation of another type of pneumatic circuit for an embodiment of the present invention.

FIG. 9 discloses the steps of the method for practicing the present invention.

DESCRIPTION OF THE PREFERRED EMBODIMENTS

The disclosure hereof is detailed to enable those skilled in the art to practice the invention. Embodiments published herein merely exemplify the present invention which can be practiced in other specific structures. Although the frame is not depicted in the accompanying drawings, the present invention can insert spacers into grooves of frames. By way of illustration and incorporated herein by reference, those skilled in the art, will recognize the drawings of commonly owned co-pending application Ser. No. 08/934,466 entitled "Insertion Device" enable the insertion of pliable spheroid spacers into grooves. Importantly and in accordance with the invention's assorted embodiments, the various elements of the several embodiments can be constructed of any materials, suitable in the art, including but not limited to metals, plastics, or preselected combinations thereof.

Figure 1:
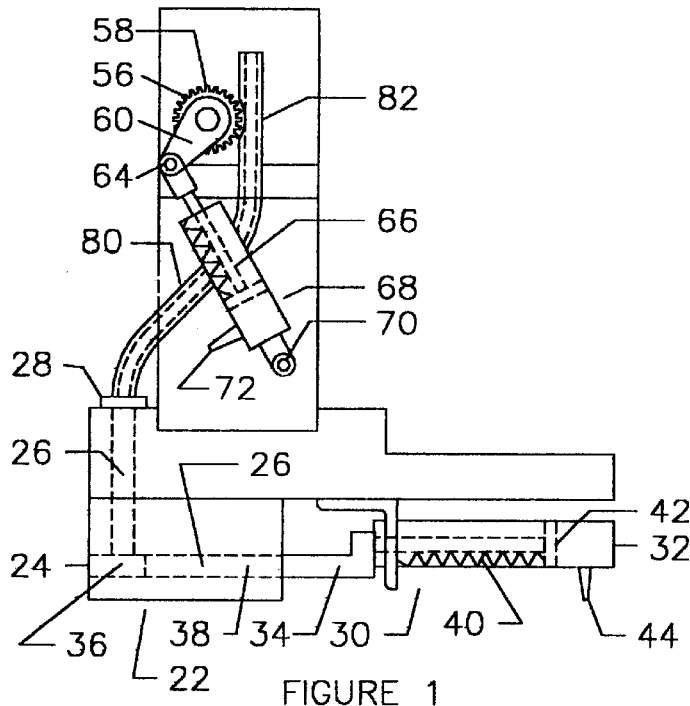
FIG. 1 is a side view of one embodiment of the present invention.

With a view toward FIG. 1, depending from base (20) is housing (22) having opening (24). Channel (26) gives the appearance much like the inverted letter T and is continuous through both base (20) and housing (22). Those skilled in the art will easily recognize housing (22) and base (20) can be engineered as a one-piece unit.

At a side of channel (26) opposite opening (24), driver (30) is positioned. As shown in this embodiment, driver (30) includes first pneumatic cylinder (32) and rod (34) having cutter (36) thereon. Cutter (36) can either be attached to rod (34), or alternatively, rod (34) can have a sharpened edge for severing a section of the resilient substance (not shown). As depicted in this embodiment, first pneumatic cylinder (32) is further configured with spring-(40)-assisted piston (42) for actuating rod (34). Coupling (44) attaches first cylinder (32) to air supply (not shown). Those skilled in the art will recognize piston (42) can be crafted where it in effect becomes rod (34). When inactivated, both cutter (36) and segment (38) of rod (34) are enclosed in housing (22), but upon activation cutter (36) extends from housing (22) to insert spacer (not shown) into groove of panel.

Figure 3:
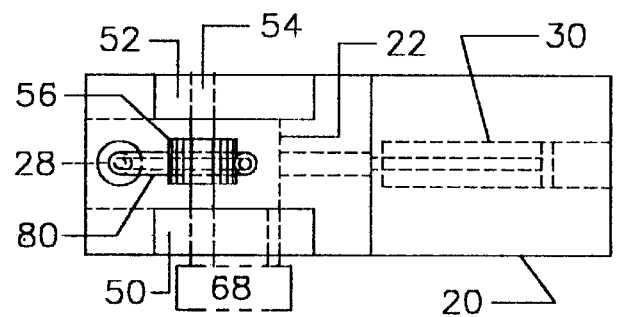
FIG. 3 is a top view of the first embodiment of the present invention.
Figure 2:
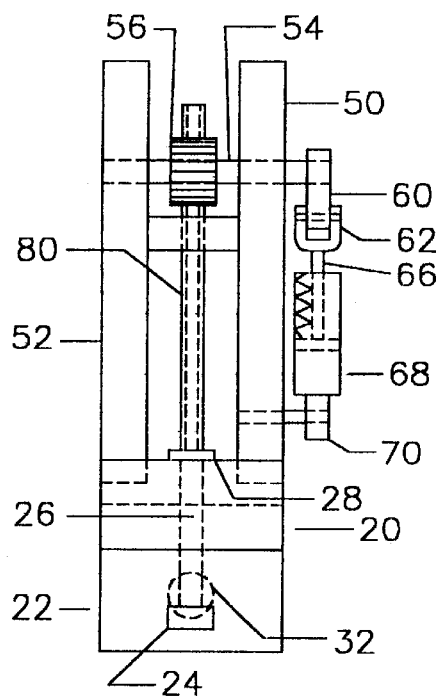
FIG. 2 is a frontal view of a first embodiment of the present invention.

Turning to FIG. 2, first arm (50), second arm (52) and conduit (80) extend upwardly from base (20). Riding on shaft (54) between first arm (50) and second arm (52) is gear (56) having teeth (58) for gripping resilient filament (not shown). As an alternative to gear (56), those skilled in the art will easily recognize shaft (54) could be equipped with an abrasive area which could function similarly to gear (56). Further, a wheel (not shown) having an abrasive thereon, as well as other specific components capable of advancing the resilient substance can be utilized to enable this particular embodiment.

Returning to FIG. 2, shaft (54) projects through first arm (50) and is attached to clutch (60). Joint (62) at a first end is attached to clutch (60) by fastener (64) while at its opposite end, joint (62) is connected to piston rod (66) of second pneumatic cylinder (68). As shown, second pneumatic cylinder (68) is mounted to first arm (50) by bolt (70), but second pneumatic cylinder can be coupled to shaft (54) as well as mounted to first arm (50) by any manner acceptable in the art.

By way of illustration, when air flows through coupling (72) of second pneumatic cylinder (68), piston rod (66) actuates clutch (60) to rotate shaft (54), thereby advancing gear (56) against resilient substance (not shown) which can be supported by conduit (80). And by way of example, in an alternative embodiment, application of sufficient tension to the resilient filament will functionally position the filament, thereby eliminating the necessity of conduit (80). In another embodiment, conduit (80) can be either closed or open and manufactured from any material firmer than the resilient filament itself, e.g., metal or rigid plastic. In the embodiment shown in FIG. 1, conduit (80) encloses resilient filament (not shown), but has an opening (82) which allows teeth (58) of gear (56) to both engage and advance the resilient substance through opening (28) into the top of channel (26) of base 20.

The resilient substance can be manually fed into channel (26), thereby bypassing the present invention's's positioner feature. In the manually feeding mode, the invention can rest upon or be attached to the work station, as well as be hand-held, by the operator. At the same time, other embodiments which include the positioner can be engineered to be either hand-held or tabletop devices. By way of illustration, shaft (54), gear (56), teeth (58), clutch (60), joint (62), second pneumatic cylinder (68) and conduit (80) or various combinations of the elements previously identified can encompass the positioner. And for further ease in understanding, in practice, hand-held embodiments are moved about the groove, whereas, for the work station embodiments, the groove is brought near the invention.

As depicted in FIG. 4, the present invention can be provided with switch (84) attached to air supply (not shown) while concurrently coupled to both first pneumatic cylinder (32) and second pneumatic cylinder (68). These couplings can be by any manner acceptable within the art, e.g., air lines. As shown in FIG. 4, switch (84) activates simultaneously both first and second pneumatic cylinders.

In FIG. 5, another alternative embodiment is disclosed. As shown, switch (86) activates first pneumatic cylinder (32) and timer (88). Actuation of second pneumatic cylinder (68) is controlled by timer (88) which has been preset to activate second pneumatic cylinder (68), when first pneumatic cylinder (32) is inactivated. Use of timer (88) allows alternative actuation of first pneumatic cylinder (32) and second pneumatic cylinder (68). Additionally, this embodiment can also be equipped with reservoir (90) for holding a predetermined volume of air to enhance the pressure provided by timer (88) to second pneumatic cylinder (68). As has been previously disclosed, these elements can be interconnected via any acceptable means within the art, such as tubing.

Examples of functional components which can be incorporated into selected embodiments of the present invention include:

a) pneumatic energy supply in the range of 70 psi;
b) Clippard block—model CM-05;
c) Clippard switch—model MJV-3;
d) Clippard valve—model R-341;
e) air cylinders;
f) sprague clutch—McMaster-Carr part #6392K22;
g) shaft for gear;
h) spur gear—Precision Industrial Components part #J1-72;
i) nylon conduit (about 1 mm O.D., about 0.8 mm I.D); and
j) 0.8 mm channel.

With a view toward FIGS. 1–5, those skilled in the art will recognize, when first pneumatic cylinder (32) is energized, driver (30) severs a section of resilient substance (not shown), thereafter forcing the section through channel (26) into the groove. Switch (86) and timer (38) calibrate activation of the positioner which is actuated by second pneumatic cylinder (68) to advance the resilient substance through opening (28) of base (20) and into channel (26). Thus, when driver (30) is at rest, a section of resilient filament is advanced anterior of driver (30) and positioned for severing upon actuation of first cylinder (32). It is the novel, nonobvious and unique interaction between these simple elements which creates this embodiment within the ambit of this invention.

Figure 6:
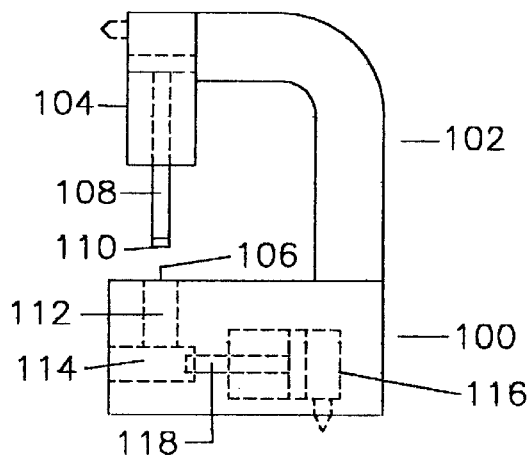
FIG. 6 is a side view of another embodiment of the present invention.

Turning to FIG. 6, a side view of another embodiment of the present invention is disclosed. Extending from base (100) is arm (102) which suspends first pneumatic cylinder (104) over aperture (106) of base (100). Rod (108) of first pneumatic cylinder is provided with cutter (110) for severing a section of resilient substance. Formed within base (100) is channel (112) which is shaped much like the inverted letter T. At one end of channel (112) is opening (114) while at an opposite end of channel (112) a second pneumatic cylinder (116) having hammer (118) is located.

As depicted in FIG. 7, the present invention can be provided with switch (120) attached to air supply (not shown) while concurrently coupled to both first pneumatic cylinder (104) and second pneumatic cylinder (116). These elements are interconnected by any manner acceptable within the art, e.g., lines or hoses. As shown, switch (120) activates simultaneously both first and second pneumatic cylinders. Thus, when hammer (118) inserts the resilient substance into groove (not shown) of panel, cutter (110) severs a section of the resilient sheet (not shown). Gravity pulls the severed section downward through channel (112), where the severed section comes to rest in the horizontal segment of channel (112) while hammer (118) is inactivated.

In FIG. 8, another alternative embodiment is disclosed. Switch (130) activates first pneumatic cylinder (104) and timer (132). Actuation of second pneumatic cylinder (116) is controlled by timer (132) which has been preset to activate second pneumatic cylinder (116), when first pneumatic cylinder (104) is inactivated. Use of timer (132) allows alternative actuation of first pneumatic cylinder (104) and second pneumatic cylinder (116). Additionally, this embodiment can also be equipped with reservoir (134) for holding a predetermined volume of air to enhance the pressure provided by timer (132) to second pneumatic cylinder (116). As has been previously disclosed, these elements can be interconnected via any acceptable means within the art, such as tubing.

Although a resilient filament, when utilized with the appropriate guide, is functional with this embodiment, it has unexpectedly been determined that a sheet of resilient substance is the preferred workpiece. Moreover, it has been determined pneumatic positioning of the resilient sheet is at best difficult. Thus, manually adjusting the sheet or filament of resilient substance relative to the last section severed is the most practical manner of positioning the resilient substance.

Looking at FIGS. 6–8, those skilled in the art will recognize, when cutter (110) is energized it severs a section of resilient substance. Gravity then pulls this substance downward through channel (112) to its horizontal branch, and the resilient section comes to rest anterior to hammer (118). Switch (130) and timer (132) calibrate activation of hammer (113) to insert the severed section of resilient substance into the groove (not shown). By alternating the actuation of first pneumatic cylinder (104) and second pneumatic cylinder (116) a section of resilient substance can always be positioned anterior to hammer (118), when it is inactivated. It is the novel, nonobvious and unique interaction between these simple elements that creates this embodiment within the scope of this invention.

FIG. 9, depicts the steps of the method of practicing the embodiments within the breadth of the present invention. The steps of the method can include non-manually severing a section of resilient substance and pneumatically inserting the section into the groove. The additional step of pneumatically positioning a resilient substance or filament, before severing a section away therefrom, are also within the scope of the execution of the present invention. Importantly, practice of the present method eliminates the requirement of an individual inserting the spacer, by hand, which has been commonplace in the industry for many years.

Having disclosed the invention as required by Title 35 of the United States Code, Applicant now prays respectfully that Letters Patent be granted for his invention in accordance with the scope of the claims appended hereto.

What is claimed is:

1. A pneumatic device for inserting a spacer into a groove of a frame, wherein said spacer is created by severing a first section from a resilient substance, said device comprising:

a) a driver equipped with a cutter for severing said first section away from said resilient substance and thereafter forcing said first section through a channel into said groove;

b) a positioner for delivering a subsequent section of said resilient substance into said channel as said spacer is inserted into said groove; and c) a source of pneumatic energy for powering said driver equipped with said cutter.

2. The device of claim 1, further comprising a switch for actuating said driver equipped with said cutter and said positioner.

3. The device of claim 2, wherein said positioner further comprises a conduit.

4. The device of claim 3, wherein said positioner further comprises a gear for advancing said resilient substance.

5. The device of claim 4, wherein said positioner further comprises a piston for energizing said gear.

6. The device of claim 5 further comprising a timer for calibrating said driver and said positioner.

7. The device of claim 6, wherein said timer further comprises a pneumatic circuit for actuating alternately said driver and said positioner.

8. The device of claim 7, wherein said section is severed from a resilient filament.

9. An insertion device for inserting a spacer into a groove of a frame, wherein said spacer is created by severing a first section from a resilient filament, said device comprising:

a) a driver including a cutter at an end thereof for severing said first section from said resilient filament and thereafter driving said spacer through a channel into said groove;

b) a positioner for delivering a subsequent section of said resilient filament into said channel as said spacer is inserted into said groove; and c) a source of pneumatic energy for powering said driver equipped with said cutter.

10. The device of claim 9 further comprising a switch for actuating said driver equipped with said cutter and said positioner.

11. The device of claim 10 further comprising a timer and a pneumatic circuit for actuating alternately said driver and said positioner.

12. The device of claim 11, wherein said positioner further comprises a conduit for aligning said resilient filament with said channel and said driver.

13. The device of claim 12 further comprising a reservoir for holding a predetermined volume of air.

14. The device of claim 13, wherein said positioner further comprises an abrasive for advancing said resilient filament and a piston for energizing said abrasive.

15. The device of claim 13, wherein said positioner further comprises a gear and a piston for energizing said gear.

16. A pneumatic insertion device for inserting a spacer into a groove of a frame, wherein said spacer is created by severing a first section from a resilient filament, said device comprising:

a) a driver equipped with a cutter at an end thereof for severing said first section away from said resilient filament and thereafter driving said first section through a channel into said groove;

b) a positioner including an abrasive for aligning and advancing a subsequent section of said resilient filament into said channel after said first section of said resilient filament is inserted into said groove;

c) a pneumatic circuit for energizing said positioner and said driver equipped with said cutter;

d) a timer for calibrating actuation of said positioner and said driver; and e) a switch for actuating said pneumatic insertion device.

17. The device of claim 16 further comprising a conduit.

18. The device of claim 17 further comprising a reservoir for holding a predetermined volume of air.

19. The device of claim 18 further comprising a piston for energizing said abrasive for aligning and advancing said subsequent section.

20. The device of claim 19 wherein said abrasive is a gear.

* * * * *